(12) United States Patent
Chang et al.

(10) Patent No.: US 6,905,617 B2
(45) Date of Patent: Jun. 14, 2005

(54) ETCHING METHOD FOR MAKING FLUID BEARINGS

(75) Inventors: Kuang-Hsien Chang, Hsinchu (TW); Hung-Kuang Hsu, Taipei (TW)

(73) Assignee: Industrial Technology Research Institute (TW)

( * ) Notice: Subject to any disclaimer, the term of this patent is extended or adjusted under 35 U.S.C. 154(b) by 325 days.

(21) Appl. No.: 10/320,542

(22) Filed: Dec. 17, 2002

(65) Prior Publication Data

US 2004/0060905 A1 Apr. 1, 2004

(30) Foreign Application Priority Data

Sep. 27, 2002 (TW) ........................................ 91122432 A

(51) Int. Cl.⁷ ................................................. C23F 1/00
(52) U.S. Cl. .............................. 216/8; 216/41; 216/83; 29/898.02; 264/219; 264/269
(58) Field of Search ................................ 216/8, 41, 83; 29/898.02; 264/219, 269

(56) References Cited

U.S. PATENT DOCUMENTS

| | | | |
|---|---|---|---|
| 5,758,421 A | 6/1998 | Asada | ...................... 29/898.02 |
| 5,855,802 A * | 1/1999 | Acciai et al. | ................... 216/8 |
| 6,074,098 A | 6/2000 | Asai et al. | ................... 384/112 |
| 6,537,459 B1 * | 3/2003 | Dufresne et al. | .............. 216/8 |

* cited by examiner

Primary Examiner—Shamim Ahmed
(74) Attorney, Agent, or Firm—Birch, Stewart, Kolasch & Birch, LLP

(57) ABSTRACT

This specification discloses an etching method for making fluid bearings. The invention uses an ejection axis as the mask of the bearing cast. A protection material is inserted into the inner diameter of the fluid bearing, producing a protection pattern. After pulling out the ejection axis, the bearing cast is etched to form a desired oil groove in the inner diameter. Afterwards, the etching solution is washed away and the protection pattern is removed. The invention can be easily integrated with existing manufacturing procedures, achieving the goal of mass production and lowering costs. In addition, the invention can avoid such problems as rough edges as in the prior art. At the same time, the disclosed method makes the radial and stop parts of the fluid bearing, simplifying the manufacturing procedure.

7 Claims, 4 Drawing Sheets

ETCHING METHOD FOR MAKING FLUID BEARINGS

BACKGROUND OF THE INVENTION

1. Field of Invention

The invention is an etching method for making fluid bearings and, in particular, to a method for making the oil groove in the inner diameter of the fluid bearing.

2. Related Art

In mechanical designs, making passive fluid bearings requires an oil groove in the inner diameter of the bearing, so that a good oil film pressure and oil seal can be generated during the operation of the bearing. The oil groove in a normal bearing is made by cutting in the conventional machining. However, the motors become smaller and it is not easy to make micro motors that require high precisions. Such micro motors have strict requirements on the depth and width of the oil groove and the concentricity of the inner diameter of the bearing. If they are still made using the conventional cutting technique, there can easily be such problems of rough edges, bad oil groove concentricity, blade erosion, and difficulty in making machining blades.

The Japanese-based Hitachi, Inc proposed to use a metal to roll on the inner surface of the bearing, pressing on the surface to produce the desired oil groove. This technique is disclosed in the U.S. Pat. No. 5,758,421, and is the main technology of making fluid bearing products. However, this kind of method of using a rolling metal ball has a small contact area between the metal and the bearing, resulting in erosion. Besides, since the metal ball for making the oil groove is extremely small, consequently the metal ball holding tool is hard to design and produce. Moreover, a precisely positioned control platform is also required for the rolling.

In addition, there is a technology of using plastic injection molding to make the fluid bearing, as disclosed in the U.S. Pat. No. 6,074,098. This method utilizes the elasticity of the plastic to force the plastic bearing formed by ejection molding to leave the mold. The problem, however, is that the rigidity and hardness of the plastic bearing are not strong enough against erosion.

SUMMARY OF THE INVENTION

In view of the foregoing problems, it is an objective of the invention to provide an etching method for making fluid bearings and, more particularly, for making the oil groove in the inner diameter of the fluid bearing. The technique of using etching method to mass-produce machine parts is of course very mature; however, the technique is mostly limited to the planar parts. Therefore, the invention can easily integrate existing machine parts manufacturing procedures and achieve the goals of mass production and lowering costs. In addition, the invention can avoid the rough edge problem in the conventional machining technology. At the same time, it can make the radial and stop parts of the fluid bearing. This greatly simplifies the manufacturing procedure.

To achieve the above objective, the etching method for making fluid bearings of the invention includes the following steps. First, a cylindrical bearing cast with a cylindrical hollow wall surface in the inner diameter is provided. Secondly, an ejection axis is provided to align with the bearing cast and is inserted to attach the cylindrical hollow wall surface. The ejection axis etches several oil grooves on the cylindrical hollow wall surface, forming several protruding grooves. The protruding grooves are tightly attached to the cylindrical hollow wall surface. A mobile protection material is inserted between the protruding grooves, filling the gaps between the protruding grooves and the cylindrical hollow wall surface. Afterwards, the protection material is solidified on the cylindrical hollow wall surface to form several protection patterns. The ejection axis is then pulled out of the etching solution, so that several oil grooves are etched and formed at the protection patterns not covered by the bearing cast. Finally, the etching solution is washed away and the protection patterns are removed.

In the invention, the bearing cast is made of metal that can stand erosion, and the protection material is plastic. The plastic material can be injected into the gaps between the protruding grooves and the cylindrical hollow wall surface by injection molding. The height of the protruding grooves is between 10 $\mu$m and 100 $\mu$m. Since the protruding grooves are not too deep, it is helpful for pulling out the ejection axis and departing the mold. Furthermore, it does not hurt the protection patterns. The precision of the fluid bearing is very important. The invention uses an etching method to make the oil grooves. The etching precision and depth can be controlled by selecting an appropriate etching solution and time.

In addition, the etching method according to the invention does not have the problems of blade erosion and difficulty in blade machining. Neither does it have the difficulty in precision and alignment requirements as using metal ball machining.

BRIEF DESCRIPTION OF THE DRAWINGS

The invention will become more fully understood from the detailed description given hereinbelow illustration only, and thus are not limitative of the present invention, and wherein.

DETAILED DESCRIPTION OF THE INVENTION

The specification describes an etching method for making fluid bearings. The invention utilizes an ejection axis as the photo mask of the bearing cast. A protection material is injected into the inner diameter of the fluid bearing to produce a protection pattern, in the same way of producing the photoresist pattern in the photolithography technology. After pulling out the ejection axis, the bearing cast is etched to form desired oil grooves in the inner diameter. Finally, the etching solution is washed away, removing the protection pattern.

To describe the invention is more detail, we list the manufacturing procedure of an embodiment with reference to the corresponding figures (FIGS. 1 through 8).

Figure 1:
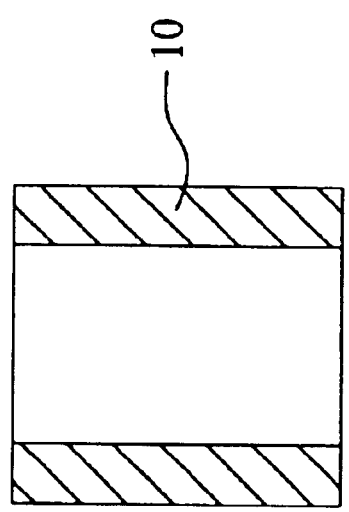

First, a cylindrical bearing cast 10 is provided. As shown in FIG. 1, the inner diameter part has a cylindrical hollow wall surface. The bearing cast is selected from an erosion-resistant metal.

Figure 2:
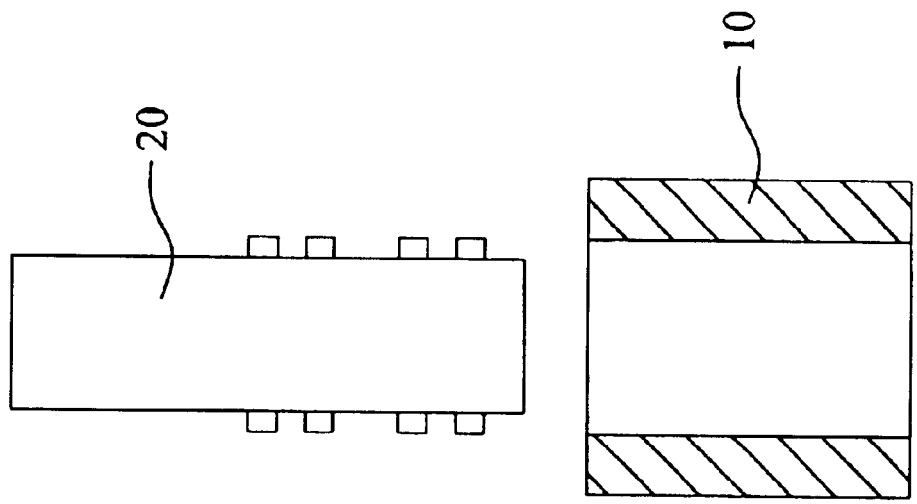
FIGS. 1 through 8 show schematic views of the manufacturing process according to an embodiment of the disclosed etching method for fluid bearings.

An ejection axis 20 fitting the inner diameter of the bearing cast is then provided, as in FIG. 2. The ejection axis 20 has to be aligned with the bearing cast 10 and extends to be attached with the cylindrical hollow wall surface. The ejection axis 20 has several protruding grooves formed at positions that are to be etched into several oil grooves. The protruding grooves are tightly attached onto the cylindrical hollow wall surface so that the ejection axis 20 becomes the photo mask of the bearing cast 10.

Figure 3:
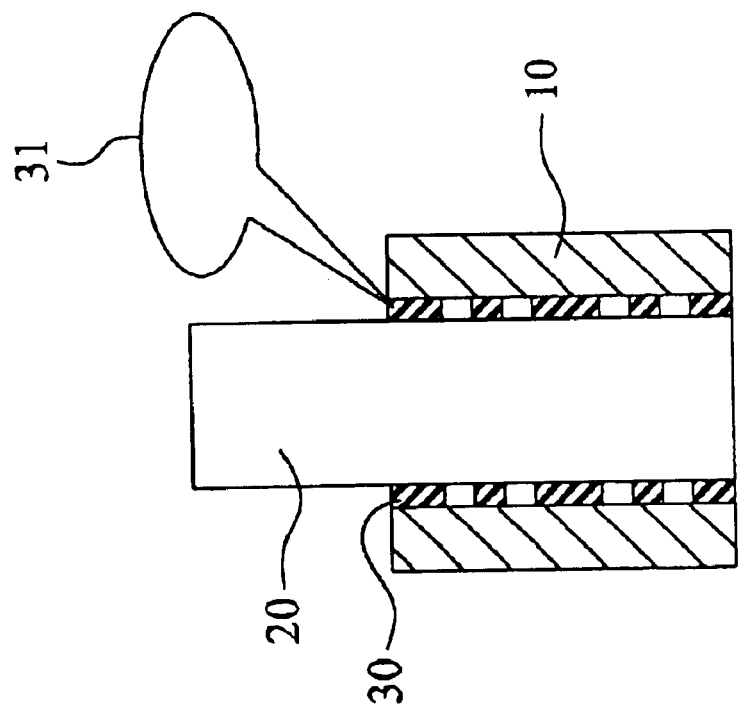

As shown in FIG. 3, a mobile plastic material 30 is inserted into the inner diameter of the bearing cast by injection molding. The plastic material 30 is pushed by an injection molding machine 31 with an appropriate pressure into the gaps between the protruding grooves on the ejection axis 20 and the bearing cast 10, completely filling the space in between. Since the space is very small, a plastic material 30 with high mobility is required to fill the gap without difficulty.

Figure 4:
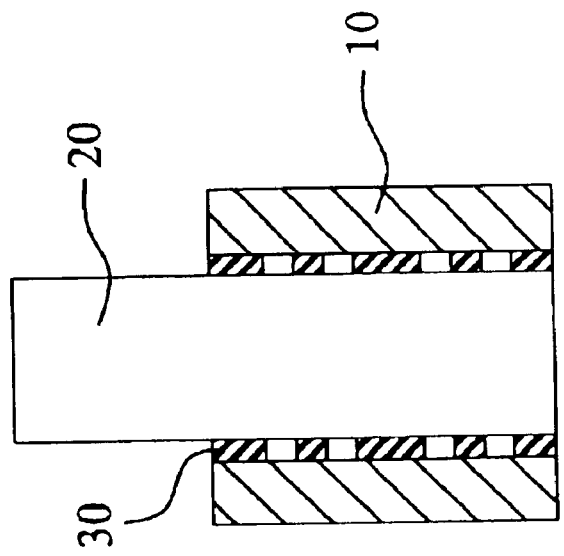

With reference to FIG. 4, the mobile plastic material 30 undergoes appropriate pressure and condensation so that it is solidified on the cylindrical hollow wall surface. Due to the protruding pattern on the ejection axis 20, several protection patterns are formed.

Figure 5:
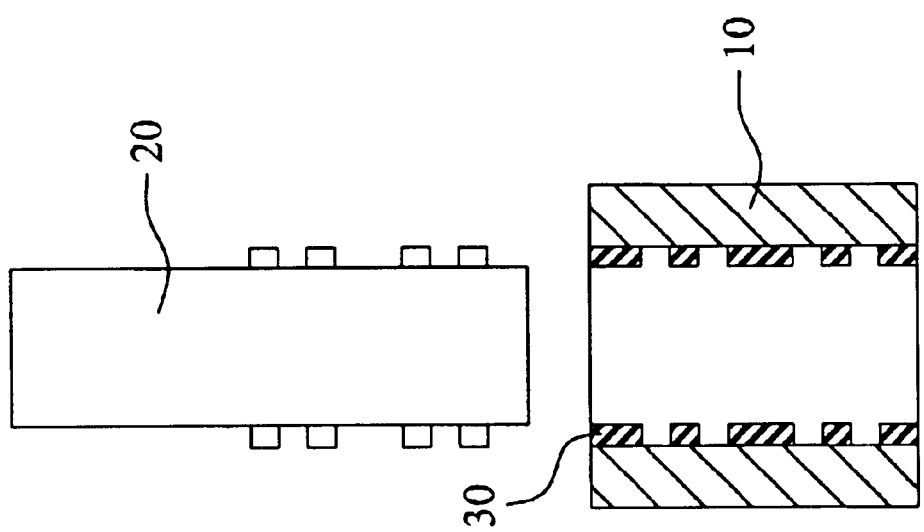

Afterwards, we use the ejection axis 20 to pull out the mold. As shown in FIG. 5, the ejection axis 20 is pulled out of the bearing cast 10, separating the ejection axis 20 from the protection patterns on the cylindrical hollow wall surface. The protruding grooves on the surface of the ejection axis 20 have a height between 10 $\mu$m and 100 $\mu$m. Therefore, the height of the protection patterns also falls in the same range. Since the protruding grooves on the surface of the ejection axis 20 is very small, it does not hurt the protection patterns when one uses the forced pushing method to pull out the mold.

Figure 6:
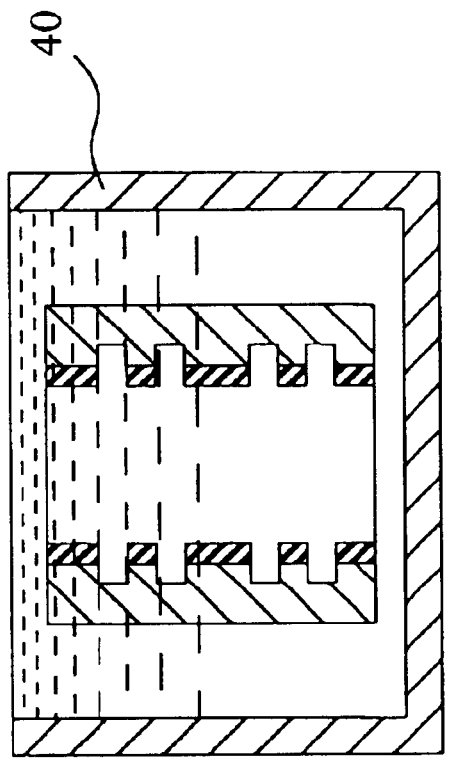

The following step is etching. As shown in FIG. 6, the bearing cast 10 is placed in an etching tub 40, which contains an etching solution enough to immerse the whole bearing cast 10. It etches the parts uncovered by the protection patterns on the bearing cast 10, forming the desired oil groove. It should be noted that the etching solution is selected according to the bearing cast 10 and the plastic material 30 used in the embodiment.

Figure 7:
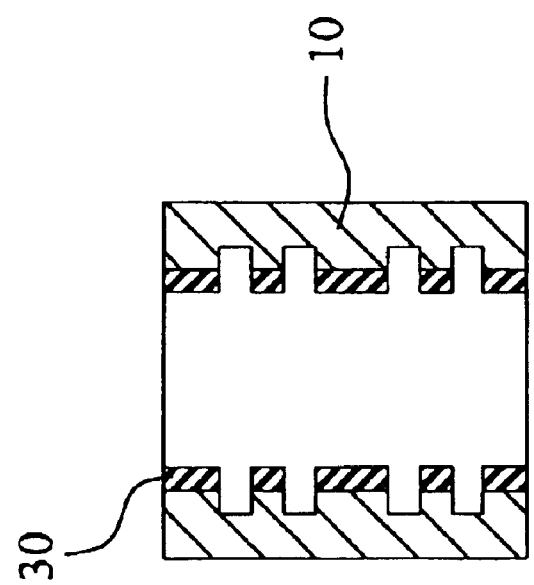

After etching, the etching solution needs to be washed away to avoid over-etching on the oil groove to affect the machine precision and depth (FIG. 7). The invention uses an etching method to form the oil grooves. The precision and depth can be controlled by selecting an appropriate etching solution and the corresponding etching time.

Figure 8:
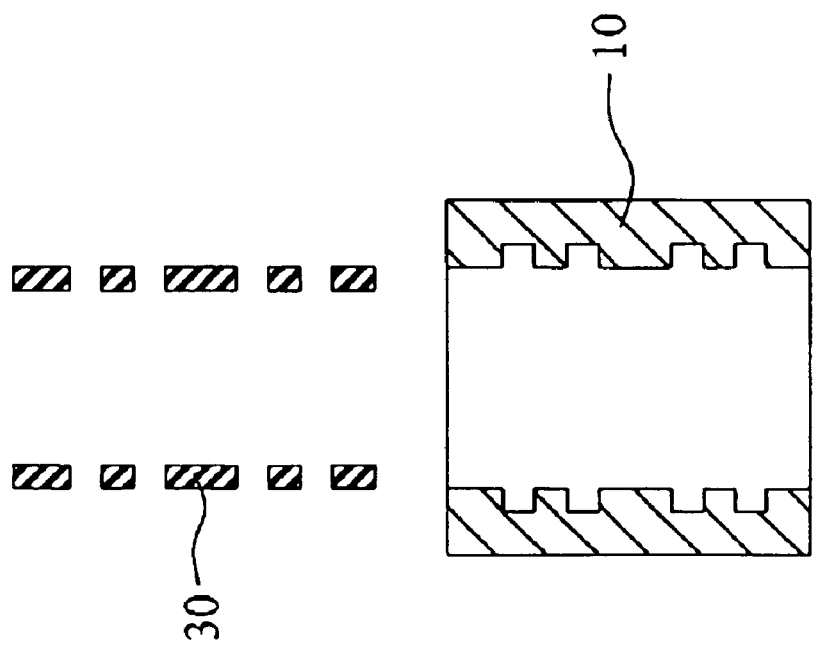

Finally, the protection patterns on the cylindrical hollow wall surface are removed. The product is shown in FIG. 8. The protection patterns can be removed by cutting, etching or direct pulling. In addition, the invention is used in making fluid bearings, and the protruding grooves on the ejection axis can be several screw threads.

Effects of the Invention

The disclosed etching method for making fluid bearings can be used to make the oil grooves inside a tiny fluid bearing. It can be easily integrated with existing manufacturing techniques for mass production and cost reduction. On the other hand, the invention does not only avoid the rough edge problem that happens in the prior art, but also can make the radial and stop parts of the fluid bearing at the same time. This greatly simplifies the manufacturing process.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An etching method for making fluid bearings, comprising the steps of:
   providing a bearing cast, which has a cylindrical hollow wall surface;
   providing an ejection axis, which is aligned with the bearing cast, extends into and attaches on the cylindrical hollow wall surface, the ejection axis being formed with a plurality of protruding grooves at positions corresponding to a plurality of oil grooves to be formed on the cylindrical hollow wall surface and the plurality of protruding grooves being tightly attached on the cylindrical hollow wall surface;
   filling a mobile protection material into gaps between the protruding grooves;
   solidifying the protection material on the cylindrical hollow wall surface to form a plurality of protection patterns;
   pulling the ejection axis out of the bearing cast, separating the ejection axis from the plurality of protection patterns on the cylindrical hollow wall surface;
   immersing the bearing cast in an etching solution so that parts of the bearing cast not covered by the protection patterns are etched to form the plurality of oil grooves;
   washing away the etching solution; and
   removing the plurality of protection patterns.

2. The etching method of claim 1, wherein the bearing cast is made of an erosion-resistant metal.

3. The etching method of claim 1, wherein the protection material is plastic.

4. The etching method of claim 3, wherein the plurality of protruding grooves is a plurality of threads.

5. The etching method of claim 3, wherein the plastic is filled into the gaps between the plurality of protruding grooves and the cylindrical hollow wall surface by injection molding.

6. The etching method of claim 1, wherein the height of the plurality of protruding grooves is between 10 $\mu$m and 100 $\mu$m.

7. The etching method of claim 1, wherein precision and depth of the plurality of oil grooves are determined by the etching solution and the etching time.

* * * * *